United States Patent [19]
Bogatin et al.

[11] Patent Number: 5,589,065
[45] Date of Patent: Dec. 31, 1996

[54] MAGNETOHYDRODYNAMIC DEVICE

[75] Inventors: Jacob G. Bogatin, Richboro, Pa.; Vladimir Podoyma, Leningrad State, U.S.S.R.

[73] Assignee: YBM Magnetics, Inc., Newtown, Pa.

[21] Appl. No.: 191,838

[22] Filed: Feb. 4, 1994

[51] Int. Cl.[6] .................................................. C02F 1/48
[52] U.S. Cl. .................................... 210/222; 123/538
[58] Field of Search .................................. 210/222, 695; 123/538

[56] References Cited

U.S. PATENT DOCUMENTS

| | | | |
|---|---|---|---|
| 2,652,925 | 9/1953 | Vermeiren | 210/222 |
| 2,939,830 | 6/1960 | Green et al. | 204/248 |
| 3,228,878 | 1/1966 | Moody | 210/222 |
| 3,349,354 | 10/1967 | Miyata | 335/209 |
| 3,669,274 | 6/1972 | Happ et al. | 210/222 |
| 3,762,135 | 10/1973 | Ikebe et al. | 55/100 |
| 3,923,660 | 12/1975 | Kottmeier | 210/222 |
| 4,146,479 | 3/1979 | Brown | 210/222 |
| 4,153,559 | 5/1979 | Sanderson | 210/222 |
| 4,210,535 | 7/1980 | Risk | 210/222 |
| 4,347,133 | 8/1982 | Brigante | 210/138 |
| 4,367,143 | 1/1983 | Carpenter | 210/222 |
| 4,372,852 | 2/1983 | Kovacs | 210/222 |
| 4,485,012 | 11/1984 | Ehresmann | 210/223 |
| 4,605,498 | 8/1986 | Kulish | 210/222 |
| 4,946,590 | 8/1990 | Hertzog | 210/222 |
| 5,248,437 | 9/1993 | Forrest | 210/695 |

FOREIGN PATENT DOCUMENTS

| | | | |
|---|---|---|---|
| 0277112 | 8/1988 | European Pat. Off. . | |
| 295463 | 12/1988 | European Pat. Off. | 210/222 |
| 2653425 | 4/1991 | France . | |
| 1520017 | 11/1989 | U.S.S.R. | 210/222 |
| WO84/04294 | 8/1984 | WIPO . | |
| WO85/03649 | 8/1985 | WIPO | 210/222 |

OTHER PUBLICATIONS

Kreitz, Gregory A., "Magnetizers may attract a following," *Reading Eagle*, Dec. 18, 1988, pp. B-1,2.
Andrews, Edmund L., "Magnetic Fields to Help Plants Grow," *The New York Times*, Jan. 11, 1992.
Magnetizer Water Conditioner Brochure, 1987.
Aqua-Flo Inc. Sales Brochure, 1988.
Vick, William S., "Magnetic Fluid Conditioning," *Environmental Engineering*, Jul. 1991, pp. 567–573.

*Primary Examiner*—Matthew O. Savage
*Attorney, Agent, or Firm*—Caesar, Rivise, Bernstein, Cohen & Pokotilow, Ltd.

[57] ABSTRACT

An apparatus for magnetically treating fluid comprised of non-polar molecular clusters, such as water, flowing therethrough is provided. The apparatus includes a housing having an inlet and an outlet, which housing is adapted to permit fluid flow therethrough between the inlet and the outlet within the interior thereof. In the two embodiments disclosed, a magnet arrangement is positioned either totally within or partially surrounding and associated with magnets within the housing to provide a harmonic magnetic field within the housing. The strength of the harmonic magnet field is variable along the housing in response to fluid flow therethrough. In addition, a method of magnetically treating non-polar fluids comprised of cluster molecules, such as water, is disclosed.

11 Claims, 3 Drawing Sheets

MAGNETOHYDRODYNAMIC DEVICE

FIELD OF THE INVENTION

This invention relates to magnetic fluid conditioning and more particularly to conditioning or treating fluids such as liquids, and especially water, by the use of permanent magnets. Furthermore, this invention relates to the magnetic treatment of water to encourage plant growth.

BACKGROUND OF THE INVENTION

Prior to this invention, it has been well known and documented that magnetic treatment of water can be very helpful in softening water and in helping to discourage the formation of scale associated with the handling of calcarious waters which deposit scales or encrustation on heat exchanger and conduit surfaces, such as found in water supply lines in industrial and residential situations. Also, it is known that such treated waters may be used to eliminate previously deposited scales from surfaces contacted by untreated waters.

Prior art patents relating to magnetic water conditioning techniques which utilize permanent magnets have proposed the use of everything from simple elongated bar magnets that are polarized along their longitudinal axes, to cylindrical discs that are polarized along their diameters. In some instances, elongated bar magnets that are polarized along their diameters have been advocated, and the facial polarization of disc type magnets along their axes of symmetry has also been advocated. Included with the various different types of permanently magnetized structures and their arrangements are structures which require fluid flow parallel to the polar axes of the magnets, structures which direct the fluid perpendicular to the polar axes, as well as other and various complicated and expensive structural arrangements that have advocated other desired flow characteristics. In particular, the inventor is aware of the following U.S. patents which disclose various different types of devices for magnetically conditioning water: U.S. Pat. No. 2,65 2,925 to Vermeiren; U.S. Pat. No. 2,939,830 to Green et al.; U.S. Pat. No. 3,228,878 to Moody; U.S. Pat. No. 4,146,479 to Brown; U.S. Pat. No. 4, 153,559 to Sanderson; U.S. Pat. No. 4,210,535 to Risk; and U.S. Pat. No. 4,605,498 to Kulish.

These prior art arrangements for providing the seemingly desired flow paths relative to the flux fields are expensive to incorporate into commercial designs for water conditioning and are devised primarily to prevent or remove scaling of pipes and equipment.

United States, Canadian and European investigations have also confirmed that the magnetic treatment of water can be extremely beneficial in helping to promote plant growth. These studies show healthier, richer lawn growth and increased vegetable and fruit yields. Magnetically treated water, free (neutralized) from harmful chemicals, enhances fertilizer and passes more readily through compacted topsoil. The "smaller" molecules associated with magnetically treated water are absorbed more easily through capillary action in plants and vegetable roots, and can carry beneficial nutrients to more areas than non-treated water. This results in a stronger and more well-developed root system, which in turn allows more nutrients for development of above-ground growth where photosynthesis takes place.

Even though it has been recognized that magnetic treatment can have beneficial effects on plant growth characteristics, there has not been developed, to the best of the inventor's knowledge, an effective and economical apparatus which can be easily used to treat water, or any other liquids, inexpensively by using permanent magnets.

OBJECTS OF THE INVENTION

With the above background in mind, it is a primary object of the invention to magnetically treat liquids, especially water, in a more efficient and economical manner than has been previously possible.

It is an object of this invention to magnetically treat liquids, especially water, to enhance the growth characteristics of plants.

It is a further object of the invention to provide a liquid treatment device which can be easily assembled and easily attached to a liquid source for treatment of the liquid by permanent magnets.

It is yet another object of the invention to provide a device which will have a high strength harmonic magnetic field for the treatment of liquid passing therethrough by varying the distance between magnetic poles in the treatment device in relation to the flow of liquid therethrough.

It is a still further object of the invention to provide a method of treating liquids, especially water, wherein the molecular clusters comprising the liquid being treated are subjected to a high strength variable harmonic magnetic field in order to break down the molecular clusters.

SUMMARY OF THE INVENTION

An apparatus is provided for magnetically treating a fluid comprised of non-polar molecular clusters, such as water, by having the fluid flow therethrough. The apparatus includes a housing with an inlet and an outlet, the housing being adapted to permit the fluid to flow therethrough between the inlet and the outlet within the interior of the housing. Permanent magnet means are associated with the housing to provide a harmonic magnetic field within the housing, the strength of the harmonic magnetic field being variable in response to the flow of fluid through the housing.

In a first embodiment, the magnet means includes a plurality of permanent magnets positioned within the housing. A first magnet is stationarily positioned transverse to the fluid flow direction and has first and second sides of opposite polarity. There is also an opening through the first magnet. Positioned adjacent the first magnet is a second magnet. The second magnet is spaced from the first magnet and has an outer circumference spaced from the interior surface of the housing. The second magnet also has first and second sides of opposite polarity. The first and second magnets are parallel to each other with sides of opposite polarity facing each other. The first and second magnets are spaced from each other by a plug member which fits into an opening through the second magnet and which extends into the opening of the first magnet. The plug member spaces the first and second magnets from each other and has channels therethrough to permit fluid to flow around the second magnet, through the channels and into the central opening of the first magnet.

The second magnet is further held in position within the housing by means of various resilient supports and a resilient spacer between the first and second magnet. In this manner, fluid flow through the housing causes the second magnet to move within the housing under the influence of the fluid flow therefrom. The movement between the first and second magnets establishes a harmonic magnetic field through which the fluid can flow.

In the first preferred embodiment, a third magnet is positioned adjacent the first magnet on the side of the first magnet opposite the second magnet and is held within the housing in the same manner as the second magnet.

In a second embodiment of the invention, the housing is a hollow pipe with magnets positioned diametrically opposite each other on the outside of the pipe. The interior of the pipe is filled with a plurality of spherical isotropic magnets which are moveable with respect to each other under the influence of fluid flowing through the housing or pipe.

A method is also taught herein wherein non-polar molecular clusters are magnetically treated. A confined flow path is provided and a harmonic magnetic field capable of having variable magnetic strength within and along the confined flow path is created using permanent magnets. The strength of the harmonic magnetic field is variable along the length of the flow path in response to fluid passing therethrough. By passing fluid to be treated through the flow path and through the harmonic magnetic field, the magnetic field strength varies in response to the flow characteristics of the fluid and causes the non-polar molecular clusters to reorient in a polar manner and break apart.

BRIEF DESCRIPTION OF THE DRAWINGS

Other objects and many of the attendant advantages of the instant invention will be readily appreciated as the same becomes better understood by reference to the following detailed description when considered in conjunction with the accompanying drawings wherein.

DETAILED DESCRIPTION OF THE INVENTION

Figure 1:
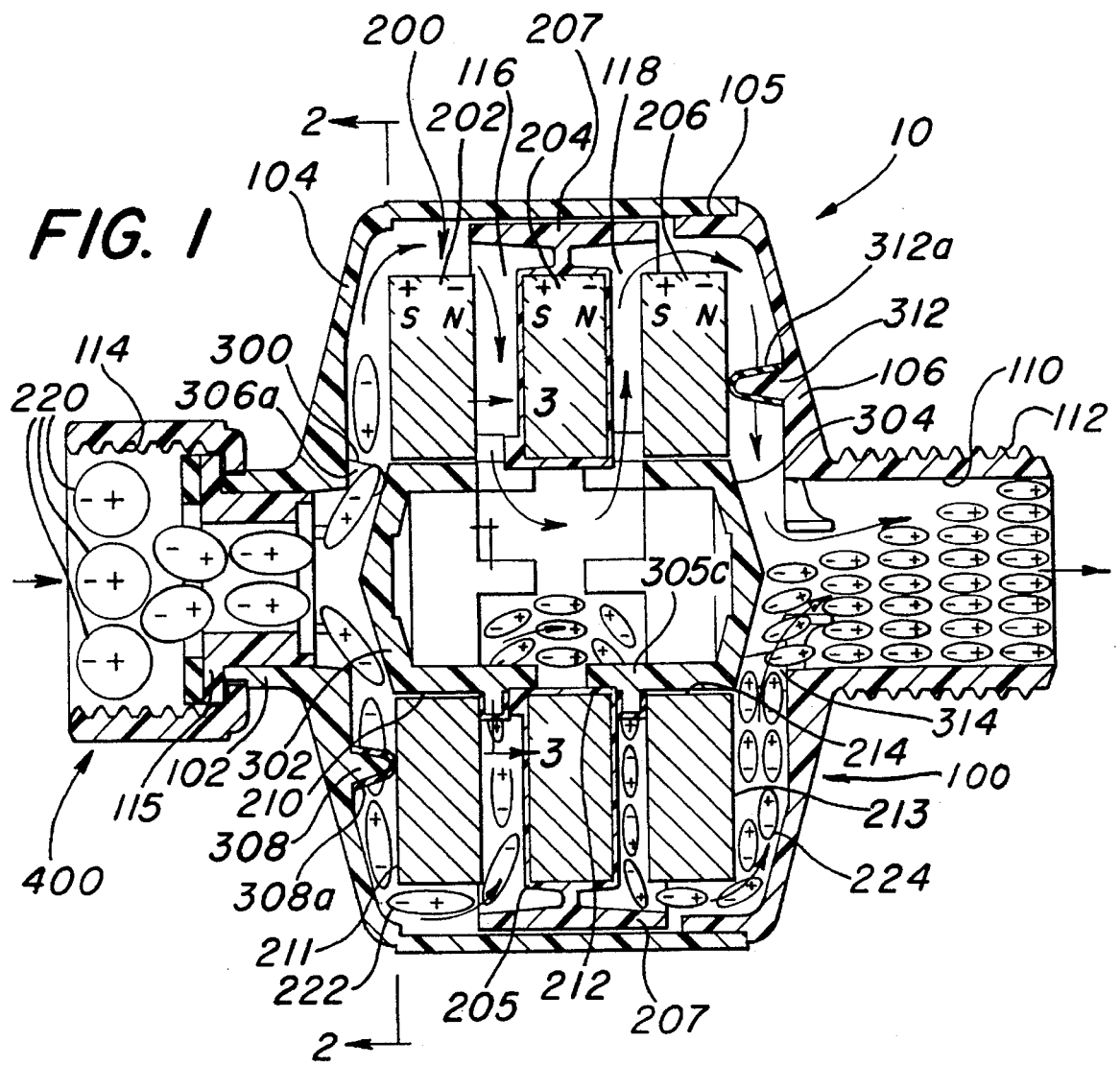
FIG. 1 is a cross-sectional view of one embodiment of a magnetic fluid treatment device of the present invention showing fluid flow therethrough.

Referring now in greater detail to the figures of the drawings wherein like reference characters refer to like parts, a magnetic fluid treatment device of the present invention is shown generally at 10 in FIG. 1. In the first embodiment shown in FIG. 1, the treatment device comprises a housing 100 surrounding a magnet assembly 200 through and around which the fluid being treated passes. A support structure 300 positions and holds the magnet assembly 200 within the housing. Further provided at the inlet 102 into the housing 100 is a coupling device 400 for joining the treatment device to a fluid source.

As shown in FIG. 1, the housing 100 comprises an inlet housing member 104 and an outlet housing member 106. Both of the housing members are preferably molded plastic and sealingly joined together at a seam 105 by any suitable means, for example by heat or adhesive sealing. The inlet housing member 104 has the reduced diameter inlet portion 102, and the outlet housing member 106 has a reduced diameter outlet portion 110. The two housing members 104, 106 in the preferred embodiment have a circular cross-section and are coaxially aligned when the two members are joined. The housing members are preferably made of high-strength, non-magnetic material, such as plastic, which is capable of withstanding the pressure of fluid flow therethrough. Likewise, the inlet 102 and the outlet 110 in the preferred embodiment have circular cross-sections and are coaxially aligned when the two housings members are joined.

The magnet assembly 200 in the first embodiment includes, as shown in FIG. 1, three circular, planar, permanent magnets 202, 204, 206. The magnets are each magnetically oriented with the magnetic poles on the planar surfaces thereof. As shown in FIG. 1, the first magnet 202 has its negative (north) pole surface adjacent and spaced from the positive (south) pole surface of the second magnet 204. The positive (south) pole surface of the third magnet 206 is adjacent and spaced from the negative (north) pole surface of the second magnet 204 opposite the first magnet 202. All of the magnets 202, 204, 206 are cylindrical disc-shaped magnets, and each has a circular opening 210, 212, 214, respectively, therethrough.

Figure 2:
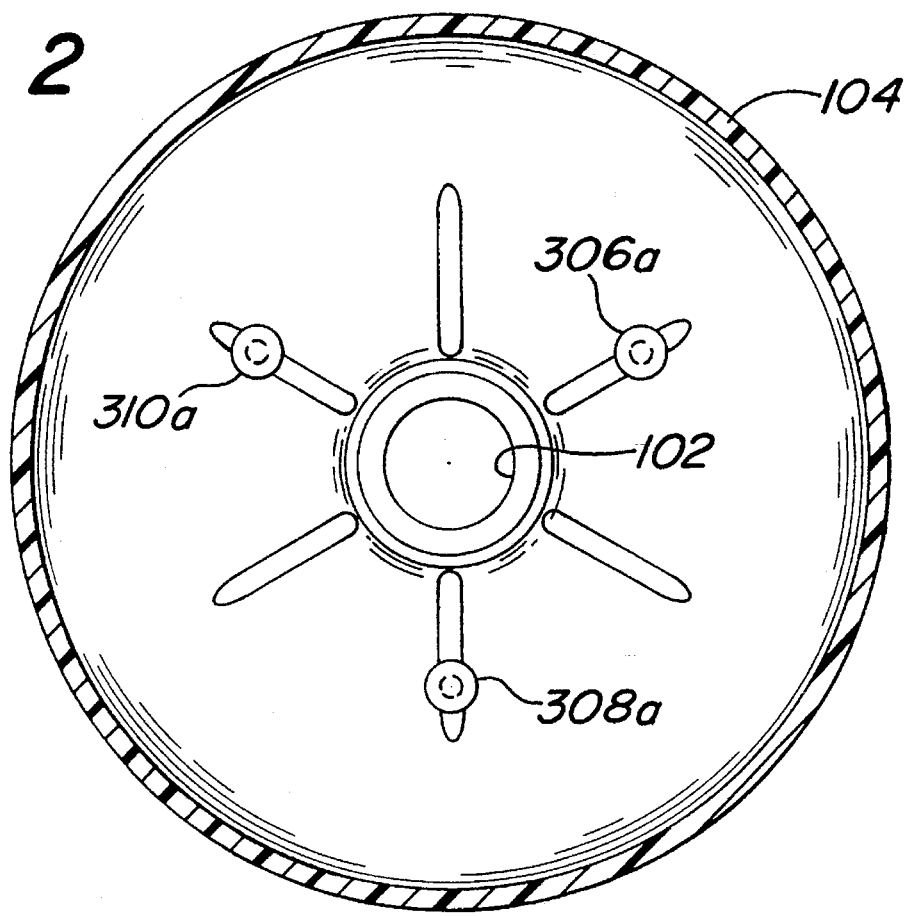
FIG. 2 is a cross-sectional view taken along the line 2—2 of FIG. 1.

As shown in FIG. 1, the support structure 300 which holds and maintains the magnet assembly 200 within the housing 100 includes a pair of first plugs 302, 304 that, when positioned within the openings 210, 214 of the first and third magnets and in opposite sides of the opening 212 in the central magnet, join the three magnets together in a spaced relationship. The support structure 300 further includes a plurality—in this preferred embodiment, six—of magnet holders 306, 308, 310, 312, 314 and 316 (not shown in the cross section of FIG. 1 ) which extend inwardly from the inside surface of the two housing members 104, 106 toward and against the positive pole surface 211 of the first magnet 202 and toward and against the negative pole surface 213 of the third magnet 206. The magnet holders 306–316 each have positioned thereover a base member or cap 306, 308a, 310aa, 312a, 314a and 316a (not shown in cross section of FIG. 1 ), respectively, and as shown in cross section in FIG. 1 at 312a, 308a. The magnet holders are preferably integrally molded with the inside of the inlet and outlet housing members 104, 106 at equidistant locations around each housing member (FIG. 2), and the base members or caps over the magnet holders 306–316 urge against the outer planar surfaces of the first and third magnets as discussed above. The base members or caps are comprised of compressible elastomeric material, such as synthetic rubber or plastic which allows flexibility of compression and expansion.

Figure 3:
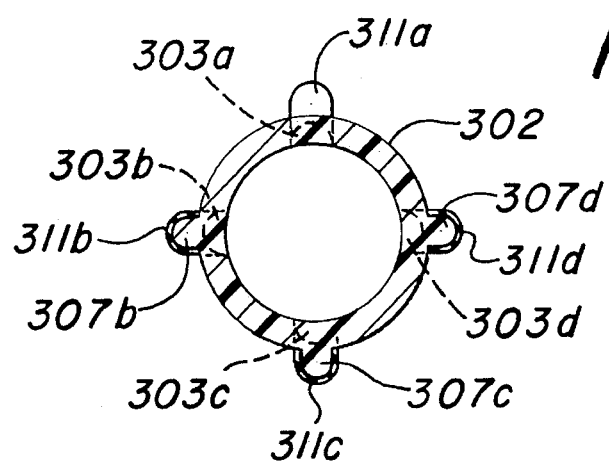
FIG. 3 is a cross-sectional view taken along the line 3—3 of FIG. 1.
Figure 4:
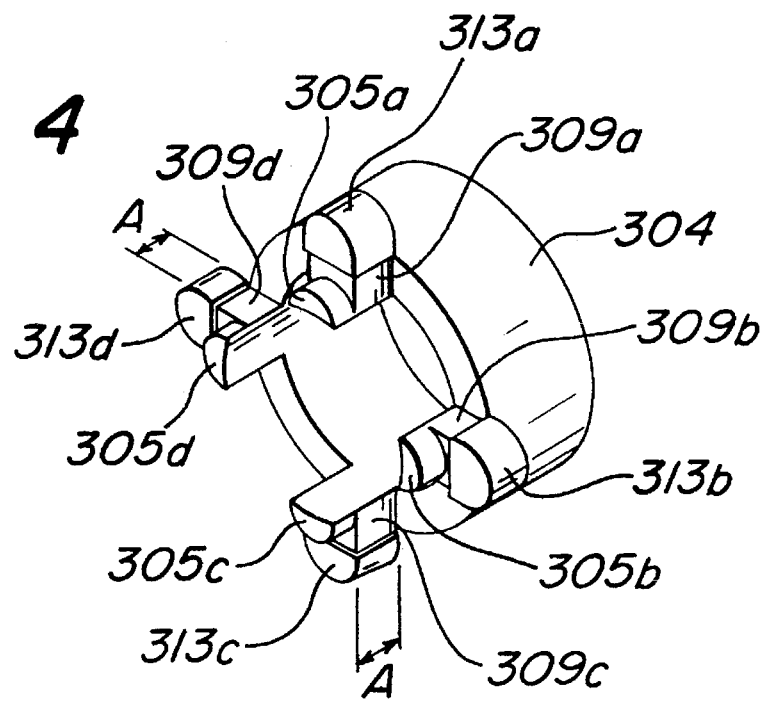
FIG. 4 is an isometric view of one of the spacer plugs which space the magnets as shown in FIG. 1.

The plugs 302, 304 are preferably made of molded plastic material, fit securely within the openings 210, 214 in the first and third magnets 202, 206 and prevent fluid flow therethrough, and project into each side of the opening 212 through the second magnet 204. As can bee seen in FIGS. 3 and 4, each of the plugs 302, 304 has four circumferentially positioned extensions 303a–d and 305a–d, respectively.

These projections 303a–d, 305a–d each have at a right angle thereto a second projection or knob 307a–d, 309a–d and slip-fitted around each knob is a cap 311a–d, 313a–d, respectively. Each cap has an outside thickness "A" that, when the plugs 302, 304 are in position, spaces the first and third magnets from each side of the second magnet by a distance "A." Furthermore, when the plugs and associated projections are positioned within the respective openings through the first, second and third magnets, a plurality of channels are formed between the caps on the projections 307a–d, 309a–d. These channels, as will be discussed, permit fluid which fills the spaced distance between the first and second magnets to flow through the opening 212 and into the spaced distance between the second and third magnets. As shown in FIG. 1, when the plugs 302, 304 are in position within the respective openings in the first and third magnets and extend into the opening 212 through the second magnet, the three magnets are co-axially aligned.

The central first magnet 204 is preferably surrounded by a molded plastic material 205 which is molded to form an outer rim 207 around the magnet 204. This rim is preferably heat sealed or adhesively fixed to the housing, e.g., inlet housing member 104, in such a manner as to prevent fluid flow around the magnet 204.

As further shown in FIG. 1, the reduced diameter outlet portion 110 of the housing member 106 is threaded 112 on its circumference thereof to accept a threaded coupling (not shown). The reduced diameter inlet portion 102 has an internally threaded coupling 114 rotatably mounted between a bushing insert 115 mounted within the circumference of the inlet portion 102 and the end of the inlet portion. This threaded coupling 114 is rotatable and allows the device 10 to be connected to a standard externally threaded faucet or hose.

When the device is connected to a fluid source, such as a water source, the fluid flow enters through the inlet portion 102, flows around the interior circumference of the inlet housing 104, around the exterior of the first magnet 202 and into the space 116 between the first and second magnets 202,204. From the space 116 between the magnets, the fluid flows through the channels created between the capped projections 307a–d and into the opening 212 in the second magnet 204. The fluid continues through the central opening 212 outwardly through the channels created between the capped projections 309a–d, into the space 118 between the second and third magnets 204, 206 and into the interior of the housing surrounding the third magnet 206. The fluid, after having traveled around the first magnet 202, through the second magnet 204 and lastly around the third magnet 208, exits the device through the outlet 110.

While the present invention has as a primary goal the magnetic treatment of water, it is also possible to use this device to treat other fluids comprised of non-polar clusters such as: water-based solutions, e.g., milk, syrups, creams, yogurt, etc.; alcohol-based solutions, e.g., alcohol, liquors, beer, etc.; organic and inorganic chemical liquids, solutions and suspensions, including energy-producing liquids, e.g., gasoline, kerosene, diesel fuels, etc., anti-friction liquids, e.g., oil and petroleum jellies, and cooling and heat transfer liquids, e.g., water- or oil-based coolants.

Because the three magnets 202, 204, 206 are positioned with opposite polarity poles adjacent each other, the compressible caps 311a–d, 313a–d mounted on the plugs 302, 304 keep the first and second and the second and third magnets which are magnetically attracted to each other distanced from each other. However, because the caps 311a–d, 313a–d are comprised of resilient elastomeric material, the magnetic attraction of the opposite poles squeezes the interposed caps. Also, because the base members or caps 306a, 308a, 310a, 312a, 314a, 316a on the rods are made of elastomeric material, they, too, can expand to keep a constant force against the outer planar surfaces 211, 213, respectively, of the first and third magnets when the first and third magnets are attracted to the opposite polarity of the second magnet 204. On the other hand, when fluid under pressure flows into the spaces 116, 118 between the first and second and second and third magnets, respectively, the fluid pressure urges the magnets apart, which compresses the base portions or caps 306a–316a and allows the caps 311a–d, 313a–d to expand. The significance of this expansion and contraction within the device will be appreciated more in light of discussions to follow.

It is theorized that the magnetic fluid treatment device of the present invention treats fluid (in this example, water) passing through the device by utilizing the harmonic magnetic fields of the permanent magnets 204, 206, 208 spaced from each other within the device. As best described in conjunction with the illustration of FIG. 1, these magnets create a unique sequence of energy cycles which polarize the fluid comprised of molecular clusters, as they are known, and breaks them apart into smaller molecules.

The positive-negative, positive-negative and positive-negative in-line orientation of the magnets 202, 204, 206 establishes a harmonic magnetic field within the device. Moreover, because the side magnets 202, 206 are not stationarily mounted within the device, rather they are mounted on the elastomeric supports 302, 304, the speed of the water through the device, as well as the pressure of the water into and through the device, cause the magnets 202, 206 to move with respect to the central magnet 204 and, in a sense "to vibrate," and thereby set up a dynamic system within the device. The change in the distance between the magnets affects the amplitude, or the magnetic strength, between the magnets: the closer together the magnets, the higher the amplitude, and this variation in distance due to fluid dynamic forces creates a variable harmonic field within the device.

As the amplitude changes with the fluid pressure, there is established a very special effect within the device which causes the fluid (water) molecular clusters to break apart. As shown in FIG. 1, non-polarized water clusters 220 enter the device at the inlet 102. The clusters proceed around the first magnet 202, and the non-polarized clusters begin to elongate and polarize. This polarization of the non-polarized clusters is first shown at the circumference of the first magnet 202, where the clusters 222 begin to arrange themselves with distinct positive and negative orientations. Thereafter, as the polarized clusters 222 further flow through the variable harmonic field of the device (created by the varying distances between the magnets and the speed of the molecules through the device), the elongated clusters eventually break apart into multiple polarized molecules 224. These polarized molecules 224 can retain their de-polarized state for up to approximately five hours.

It is important to note that of the magnetic amplitudes within the device are functions not only of the strength of the magnets, but also the speed and pressure of the fluid through the device, which affect the distance between the magnets. For example, if the fluid pressure is low, a stronger magnetic field is necessary, because the there is very little free energy in the slow moving low pressure molecules, and thus the cluster reactions with the magnets are slower. As the fluid pressure increases, the free energy of the fluid molecules/clusters increases and the reaction time is quicker, thus permitting lower magnetic strength to be provided. In the present invention, under low pressure conditions, the magnetic attraction between the magnets 202, 204, 206 causes the magnets to draw closer together and thereby increase the magnetic field strength therebetween. Under higher fluid pressure, with more flow between the magnets, the magnets are urged apart and the field strength is decreased.

Accordingly, under the effect of this harmonic variable strength magnetic field of this device there is reduced intermolecular attraction and surface tension, thus making the water more effective as a solvent for minerals contained in topsoil or fertilizer applied to the soil. The magnetic treatment of water by the device further reduces the pH of the water and the harmonically re-polarized and molecules "neutralize" chemicals such as salt (NaCl), chlorine or fluorine, all of which are harmful to plant growth.

Figure 5:
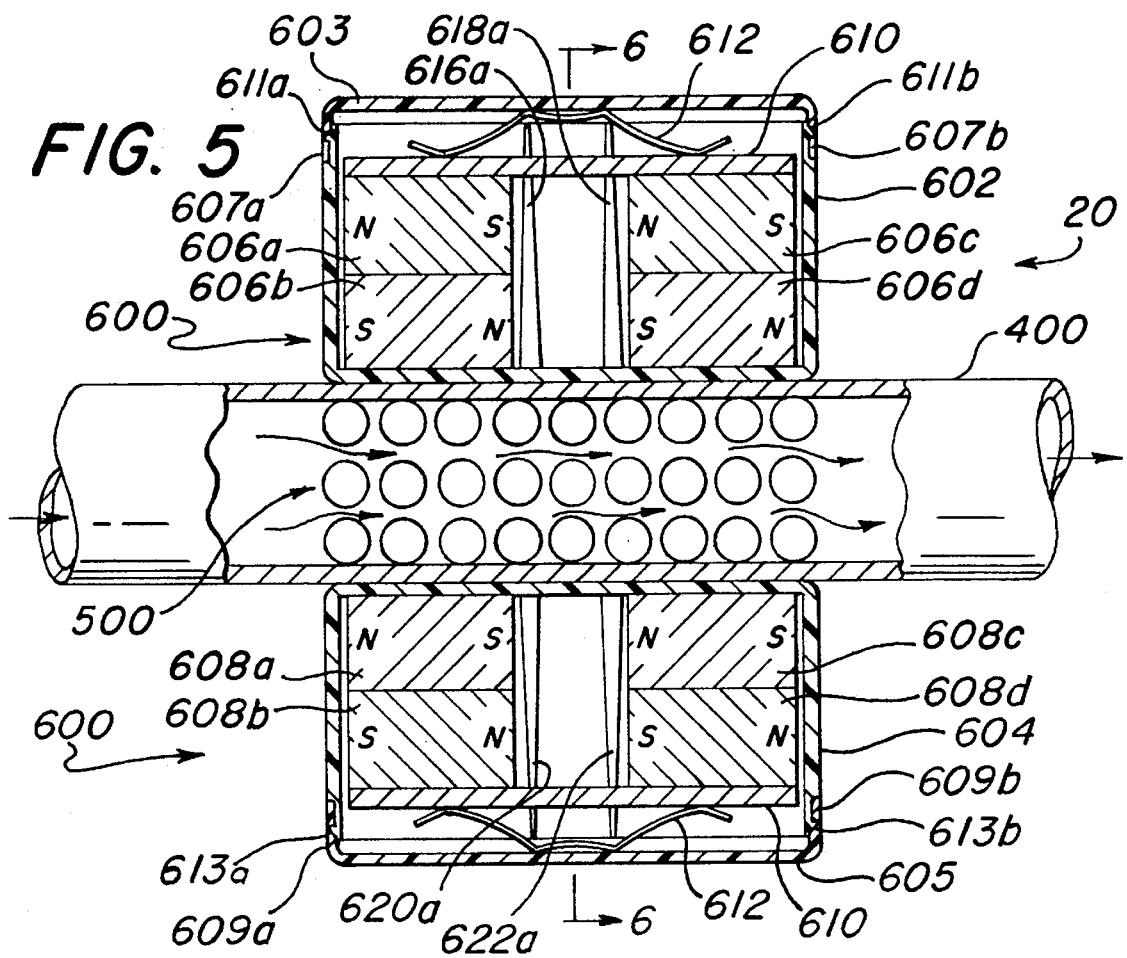
FIG. 5 is a cross-sectional view and partially cut-away view of a second embodiment of a magnetic fluid treatment device of the present invention.

The cross-section as shown in FIG. 5 is a second embodiment of the invention of the present application which also provides a harmonic variable strength magnetic field for the polarization, and thus the breaking apart of, non-polarized fluid e.g., (water) clusters which pass therethrough. As shown generally at 20 in FIG. 5, this embodiment of the invention utilizes a longitudinal tube or pipe 400 of non-magnetic material which creates a confined flowpath for the fluid to be treated. This pipe acts a housing for a plurality of spherical isotropic magnets 500. Along the outside of the pipe 400 are a plurality of spaced permanent magnets 600 arranged so that their magnetic polarities are alternating.

In this second embodiment, the permanent magnets 600 are retained in two containers 602, 604, preferably of molded plastic material, positioned opposite each other along the pipe 400. As shown in FIG. 5, a plurality of individual permanent magnets 606a–d, 608a–d are positioned in such a manner that the faces of the magnets having opposite polarity are adjacent each other. For example, in the top container 602, the first pair of magnets 606a,606b have their north and south polar faces opposite and attracting each other. Likewise, the second pair of magnets 606c,606d have their north and south polar faces opposite each other and further have their polar faces opposite the polar faces of opposite polarity in the first pair of magnets 606a, 606b. A magnetically conductive bar 610 bridges the two pairs of magnets and forms a magnetic circuit between the three spaced pairs of magnets and a biasing strip 612 positioned between the bridge 610 and the underside of the cover 603 of the container 602 urges against the bridge and securely holds the magnets in position within the container.

As can be seen in FIG. 5, the lower container 604 also contains two pairs of magnets 608a–d arranged with opposing polarities in the same manner as those magnets in the top housing 602. Furthermore, the polarities of the magnets in the lower housing are opposite the polarities of the magnets diametrically spaced across the pipe in the first container, e.g. the polarity orientation of magnet 606b is opposite to that of magnet 608a.

Inside the pipe 400 are the numerous spherical ceramic isotropic magnets 500 which are maintained in place within the pipe under the influence of the magnetic fields created by the magnets 606a–d, 608a–d opposite each other at the circumference of the pipe.

While the small spherical magnets 500 are necessary to insure that the magnetic strength of the surrounding magnets 606, 608 extends sufficiently into the pipe to affect treatment of fluid flowing through the pipe and around the magnets 500, the real importance of this plurality of spherical magnets is the motion these magnets produce under the influence of the fluid flow in the pipe. As discussed in conjunction with regard to the first embodiment of the invention described above, it is the variable harmonic strength created by the interactive movement of the magnets, in this embodiment the spherical magnets, which causes the non-polar clusters flowing through the spherical magnets to magnetically orient themselves and break apart. Without the spherical magnets within the pipe, all that would exist would be the plurality of magnets surrounding the pipe, not unlike many other patented inventions which attempt to create magnetic fields within pipes with a static—rather than variable—magnetic strength. Furthermore, in the prior types of devices, the magnetic strength is localized at the edge of the pipe. Since the purpose of the present invention is not to attempt to "magnetize" the water flowing therethrough, but rather to polarize the non-polarized clusters and thus cause them to separate or break apart into their molecular components, a static magnetic configuration is insufficient for the purpose of this invention.

When the treatment device 20 of the second embodiment is at rest, i.e. there is no fluid flow therethrough, the magnetic flux is static (i.e., does not vary) along the length of the outside magnets. However, under the influence of fluid passing through the pipe, the spherical magnets are urged closer together or further apart as the case may be in the same manner the magnets of the first embodiment move toward and away from each other under the influence of the fluid flow through the housing. A vibratory motion is created within the mass of spherical magnets that causes the harmonic magnetic strength or amplitude to vary along the length of the pipe surrounded by the magnets 606a–d, 608a–d, thereby causing the non-polarized clusters to polarize during their passage around and between the spherical magnets and to separate into their polarized molecules.

On opposite sides of the top container 602, and projecting downward therefrom are male and female projections 626, 628, respectively. Similar projections 630, 632 extend upwardly from the bottom container 604. The male projections 626, 630 have a lip 634, 636 at the end thereof which is adapted to slip inside and catch within an opening 638, 640 in its corresponding female projection (see FIG. 6), whereby the male and female projections can engage and securely hold each other. Because the containers 602, 604 and the male and female projections extending therefrom are preferably of molded plastic-type material, the male and female projections are resilient enough to slip into and engage each other when the containers are positioned around the pipe.

Figure 6:
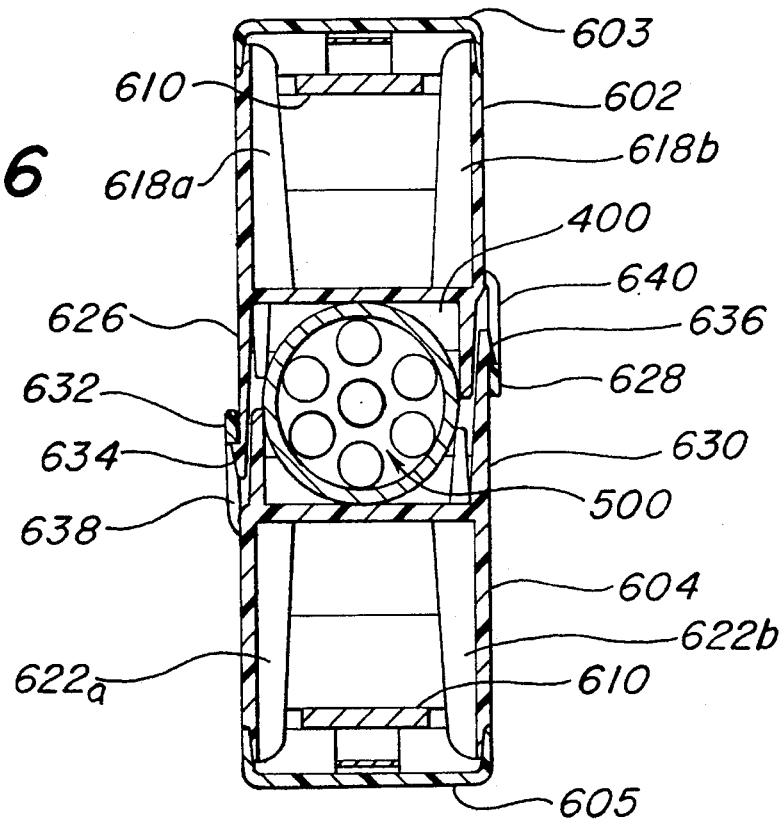
FIG. 6 is a cross-sectional view taken along the line 6—6 of FIG. 5.

As further shown in FIGS. 5 and 6, each container 602, 604 has a lid 603, 605, respectively. The lids 603, 605 have openings 607a and b, 609a and b at each end thereof, respectively, which engage prongs 611a and b and 613a and b on the sidewalls of the containers. When the lids are placed over the sidewalls of the containers and the prongs are engaged within the openings, the lids are securely held in position. Furthermore, the biasing member 612, in this case a leaf spring, is interposed between the underside of each lid and each plate member 610. These leaf springs urge against the plate members 610 and hold the plates and magnets thereunder snugly within each container.

Although FIG. 5 shows only two pairs of spaced magnets within each container, it is envisioned that the containers may be enlarged lengthwise to accommodate more pairs of magnets spaced along the pipe 400. Indeed, in a preferred embodiment, three such pairs of magnets are provided in each container. Also, it is permissible to have each set of stack magnets comprise more than two magnets as long as the magnetic poles are alternated (as shown with regard to the pairs in FIG. 5).

Though not shown in the drawings, the containers 602, 604 can also be provided with projections extending from the bottom or sides of each container which extend from each container along and tangential to the pipe 400 in order to help to stabilize the containers when locked by the male and female members around the pipe. Also, even though the bottom of each container adjacent the pipe 400 is flat, as shown in FIG. 6, an accurate projection or projections (again, not shown) may be provided which extend from each flat bottom of each container to partially surround the circumference of the pipe. These accurate projections further help to stabilize the containers around the pipe when engaged together.

Finally, as shown in FIGS. 5 and 6, the containers 602, 604 have pairs of dividing vanes 616a, 616b (not shown in cross section) and 618a, b and 620a, b (not shown in cross section), 622a, b integrally molded therein to position and space the magnets within each container.

Without further elaboration the foregoing will so fully illustrate my invention that others may, by applying current or future knowledge, adopt the same for use under various conditions of service.

We claim:

1. An apparatus for magnetically treating a fluid comprised of non-polar molecular clusters flowing therethrough said apparatus comprising:

a housing having an inlet and an outlet, said housing being adapted to permit said fluid to flow therethrough between said inlet and outlet within the interior of said housing;

a first magnet stationarily positioned transverse to the fluid flow direction within said housing, said first magnet having first and second sides of opposite polarity and an opening therethrough between said first and second sides;

a second magnet spaced from and substantially parallel to said first magnet, said second magnet having an outer circumference spaced from the interior surface of said housing, said second magnet having first and second sides of opposite polarity;

said first and second magnets being positioned adjacent and parallel to each other with sides of opposite polarity facing each other;

support means within said housing for resiliently supporting and spacing said magnet means within said housing, said support means being comprised of:

first support members between said first and second magnets resiliently spacing said first and second magnets from each other; and second support members within said housing resiliently positioning said second magnet from the interior surface of said housing;

said second magnet having an opening therethrough between said first and second sides thereof; and said first support member being comprised of a first plug fitted within said opening through said second magnet and said opening through said first magnet, and spacing said first and second magnets from each other, said first plug further having a plurality of channels therethrough communicating between the space between said first and second spaced magnets and said opening through said first magnet, said first plug being comprised of:

a first plug member fitted within said opening through said second magnet;

a plurality of first projections extending from said first plug member into said opening through said first magnet; and a plurality of second projections transverse to said first projections between said first and second magnets.

2. An apparatus as claimed in claim 1, wherein said first plug members further comprised of a plurality of resilient elastomeric caps, each of said caps being fitted around one of said second projections, whereby said first and second magnets are resiliently spaced from each other by said caps.

3. An apparatus as claimed in claim 1, wherein said second support means is comprised of:

a plurality of first rods projecting from the interior surface of said housing toward the side of said second magnet opposite the side facing said first magnet; and a plurality of resilient elastomeric caps, each of said caps being fitted onto the end of one of said first rods projecting toward said second magnet, said caps abutting said second magnet.

4. An apparatus as claimed in claim 1, further comprising a third magnet spaced from said first magnet on the side of said first magnet opposite said second magnet, said third magnet having an outer circumference spaced from the interior surface of said housing, said third magnet further having first and second sides of opposite polarity and said third magnet being positioned adjacent said first magnet with sides of opposite magnet polarity facing each other.

5. An apparatus as claimed in claim 4, wherein said support means is further comprised of:

third support members between said first and third magnets resiliently spacing said first and third magnets from each other;

fourth support members within said housing resiliently positioning said third magnet from the interior surface of said housing.

6. An apparatus as claimed in claim 5, wherein:

said third magnet has an opening therethrough between said first and second sides thereof; and said third support member is comprised of a second plug fitted within said opening through said third magnet and said opening through said first magnet, and spacing said first and third magnets from each other, said second plug further having a plurality of channels therethrough communicating between the space between said first and third spaced magnets and said opening through said first magnet.

7. An apparatus as claimed in claim 6, wherein said second plug is comprised of:

a second plug member fitted within said opening through said third magnet;

a plurality of third projections extending from said second plug member into said opening through said first magnet; and a plurality of fourth projections transverse to said third projections extending between said first and third magnets.

8. An apparatus as claimed in claim 7, wherein said second plug member is further comprised of a plurality of resilient elastomeric caps, each of said caps being fitted around one of said fourth projections, whereby said first and third magnets are resiliently spaced from each other by said caps.

9. An apparatus as claimed in claim 5, wherein said fourth support means is comprised of:

a plurality of second rods projecting from the interior surface of said housing toward the side of said third magnet opposite the side facing said first magnet; and a plurality of resilient elastomeric caps each of said caps being fitted onto the end of one of said second rods projecting toward said third magnet, said cap members abutting said third magnet.

10. An apparatus as claimed in claim 1, further comprising sleeve means mounted within said housing and surrounding at least the circumference of said first magnet and holding said first magnet stationarily in position within said housing.

11. An apparatus as claimed in claim 10, wherein said sleeve means completely surrounds the circumference of said first magnet and completely fills the space between the circumference of said first magnet and the interior surface said housing.

* * * * *